Aug. 25, 1970   J. PRIKKEL III   3,525,783
MOLD DESIGN FOR SELF-APPLICATION OF RELEASE AGENT
Filed Nov. 28, 1967

INVENTOR.
John Prikkel III
BY
George A. Grove
ATTORNEY

United States Patent Office 3,525,783
Patented Aug. 25, 1970

3,525,783
MOLD DESIGN FOR SELF-APPLICATION OF RELEASE AGENT
John Prikkel III, Dayton, Ohio, assignor to General Motors Corporation, Detroit, Mich., a corporation of Delaware
Filed Nov. 28, 1967, Ser. No. 686,261
Int. Cl. B28b 7/38; B29c 1/04
U.S. Cl. 264—39     3 Claims

ABSTRACT OF THE DISCLOSURE

A thin film of silicone fluid mold release agent is satisfactorily applied to the cavity-defining surface of a relatively thin silicone rubber mold member by providing a suitable reservoir adjacent the mold member on the side opposite the cavity-defining surface, filling the reservoir with the silicone fluid release agent and subjecting the fluid to suitable pressure whereby the fluid slowly permeates the rubber to form a thin film of release agent on the cavity-defining surface.

---

Figure 1:
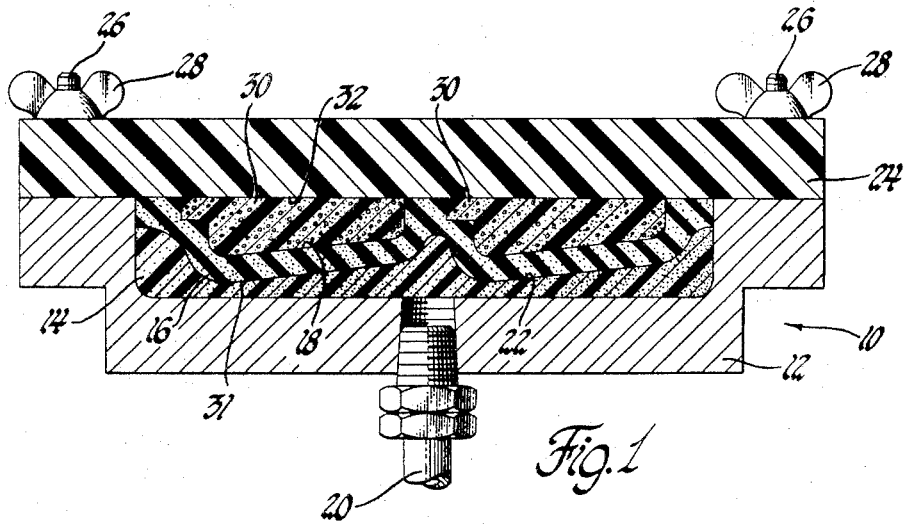

The subject invention relates to the molding of plastics, elastomers and the like in silicone rubber molds. More specifically, it relates to a method and mold arrangement whereby silicone mold release fluid may be intermittently or continuously applied to the cavity-defining surface of a silicone rubber mold through the mold wall.

Silicone fluids are well recognized for their excellent release properties in the molding of rubber and plastics and the die casting of metals. They provide a dressing on the mold surface which eliminates or reduces sticking of the molded article when it is withdrawn from the mold. It is also known that silicone rubber may be employed to make a suitable mold member particularly for the molding of other elastomers or of plastics and the like. Silicone fluids have been used in combination with silicone rubber molds to provide release properties. However, frequently there is difficulty in obtaining the desired amount of release fluid on the surface of the mold, particularly in situations wherein it is desired to reproduce sharp surface detail such as a finely grained surface. Heretofore in these situations silicone fluids have been applied by a number of ways such as spraying, brushing and the like to the surface of the mold. However, these techniques frequently result in too much of the fluid being applied to the mold surface which results in distortion of surface detail on the molded article.

It is an object of the present invention to provide a method of applying a thin film of silicone fluid release agent to the cavity-defining surface of a silicone rubber mold wherein the release agent is caused to permeate the mold wall from the backside thereof.

It is a further object of the present invention to provide a composite mold structure wherein the cavity-defining member is formed of silicone rubber and is backed up by a reservoir member which is adapted to hold a supply of silicone fluid release agent.

In accordance with the invention, these and other objects and advantages are accomplished in a preferred embodiment thereof by providing a composite mold comprised of a silicone rubber mold member which is backed up with a porous reservoir member. This is readily accomplished by first obtaining a chase of cold rolled steel or other suitable material for a working container. Aluminum shot having an average particle size of about 1/16" diameter and wherein each particle is coated with a film of epoxy resin and hardener is placed into the chase and tamped into a desired configuration. Preferably the upper surface of the aluminum shot will conform generally with the cavity-defining surface of the mold member subsequently to be produced. The epoxy resin is cured by any suitable means so that a rigid porous structure is obtained. A pattern of desired configuration is positioned just above the chase in spaced apart relationship from the aluminum shot reservoir. Viscous silicone liquid polymers containing a vulcanizing and cross linking agent which preferably is operable at room temperature is poured into the chase on top of the aluminum shot reservoir and around the pattern. When the silicone rubber has cured, the pattern is removed. A mating cavity-defining composite mold member may be prepared by the technique of the invention if such is required. Alternatively a unitary member of other suitable composition may be employed to close the mold. When molding operations are to be commenced silicone fluid is injected into the aluminum shot reservoir through a suitable opening in the chase. Under a slight pressure differential fluid permeates the rubber mold to form a thin film of the fluid on the mold cavity-defining surface. Thus, articles formed of urethane foam, for example, may readily be formed in the mold on a repetitive basis by depositing a suitable foamable urethane composition therein, closing the mold, heating the mold to cure the composition and finally opening the mold and removing the completed article therefrom. The silicone fluid release agent is caused to continuously or intermittently permeate silicone rubber mold material as required to provide release agent on the mold surface.

Figure 2:
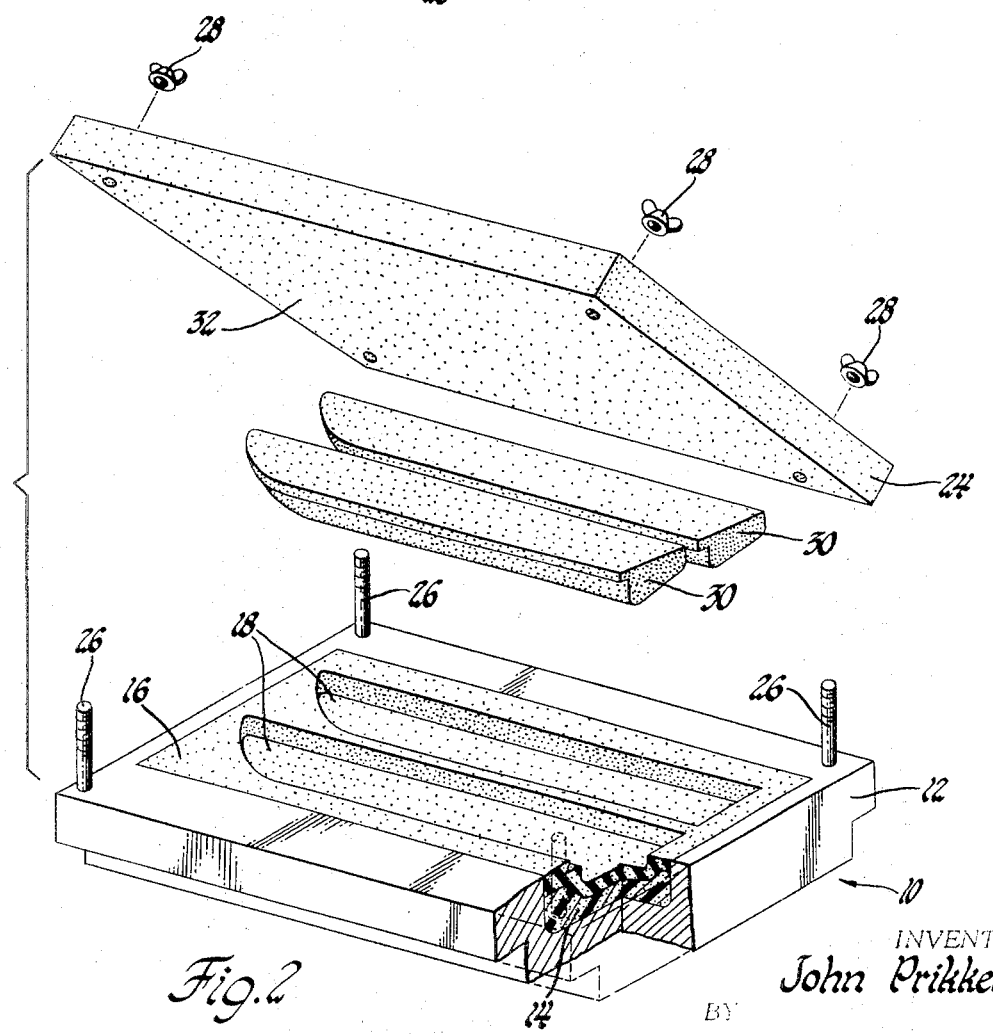

Other objects and advantages of the invention will become more apparent from a detailed description thereof reference being had to the drawings in which:

FIG. 1 is a sectional view of a composite mold member and lid with a molded article therein; and FIG. 2 is an exploded view showing a composite mold member, molded article and mold lid wherein a portion of the mold member is broken away.

In the molding of many plastic and elastomeric articles it is frequently desired to provide a fine surface detail thereon. In order to repetitively reproduce such detail from a silicone rubber mold surface it is necessary that there be no excessive build-up of release agent on the mold surface which prevents the moldable composition from flowing into each of the minute crevices of the mold cavity-defining surface. It is also necessary that there be sufficient release agent on the surface of the mold to prevent sticking. In FIGS. 1 and 2 is shown a composite mold member 10 wherein a silicone fluid release agent may be caused to permeate a silicone rubber mold member from the backside thereof to continuously provide a suitably thin film of release agent during repetitive molding operations. The composite mold member 10 is formed in a cold rolled steel chase 12 or other suitable supporting container. In chase 12 is first formed a porous reservoir member 14. Upon the reservoir member 14 is then formed a silicone rubber mold member 16 which is provided with a cavity-defining surface 18 of suitable predetermined configuration. An opening 20 is provided in chase 12 through which silicone fluid may be admitted to fill porous reservoir 14. In response to a relatively low pressure, e.g. that eqivalent to a column of silicone fluid a few inches in height above the mold surface 18, the fluid can be caused to slowly permeate the rubber mold to form a film on the cavity-defining surface 18 thereof. Then, as in conventional molding operations, a predetermined amount of urethane composition or other suitable moldable material is deposited into the composite mold member 10 on the cavity-defining surface 18. The mold is then closed with a suitable mating mold member. In the subject example, as seen in FIGS. 1 and 2, a simple flat epoxy lid 24 is employed. It is secured to the chase 12 by bolts 26 and wing nuts 28. Its inner surface 32 which will contact the molded article is waxed for release purposes. The closed mold is heated to a suitable elevated temperature to cure the moldable contents. In the example of a moldable urethane composition this is typically 130°–140° F. for ten to twenty minutes. The urethane composition foams and cures to form one or more useful molded articles such as automobile arm rest pads 30.

It has been found that for purposes of repeated molding operations it is undesirable to have a thickness of silicone rubber greater than about one inch between the upper surface of the reservoir member 22 and the cavity-defining surface 18 of the mold. For this reason the reservoir member is preferably shaped to conform generally with the cavity-defining surface 18 of the mold 10 so that the thickness of the silicone mold member 16 in these regions is fairly uniform and preferably not substantially greater than about one inch. It is, of course, desirable that the fluid permeates the rubber mold slowly so as to provide only a thin film of the release agent thereon. However, if the thickness of the silicone rubber is substantially greater than one inch, e.g. two or three inches, it is found that either there is insufficient build-up of release agent for repetitive molding operations, or excessive fluid pressures are required.

Since there is usually some pressure build-up in the normal molding of urethane foams and the like, it is necessary that the porous reservoir member 14 be structurally capable of preventing the silicone mold member 16 from sagging. For the purpose of the invention, I have found that aluminum shot, steel shot or the like, about 1/32" to 1/8" in diameter, bonded together with an epoxy resin or other suitable adhesive may be employed to form the reservoir member. The resulting structure must be porous so as to permit the admission and fairly uniform distribution of silicone fluid release agent against the opposite surface 31 of the silicone rubber mold member 16 from the cavity-defining surface 18.

The silicone rubber mold material may be formed of any conventional silicone rubber. By way of example, I have employed Dow Corning Co. silicone rubber #589, a cross-linked polydimethylsiloxane, which is a room temperature vulcanizable material. Once the reservoir member 14 has been prepared a pattern is placed in desired spaced apart relationship from the reservoir member 14 and vulcanizable silicone liquid polymer composition poured thereon and cured. When the pattern is removed, the composite mold member 10 is ready for use. A like mating mold member defining a contoured cavity may be prepared, or as in the example depicted in FIGS. 1 and 2, a simple lid 24 may be employed. Whether the mating mold member is prepared in accordance with the subject process depends, of course, upon the character of the backside of the article to be molded and the release problems encountered therewith.

In accordance with the invention, a silicone release fluid is employed such as the Dow Corning Co. 200 fluids or the General Electric Co. silicone oils, which are dimethylsiloxane polymers. We have found that such a fluid having a room temperature viscosity of about 10 centistokes to be preferable for use in accordance with this invention. The fluid is caused to flow into the reservoir member under suitable pressure, means (not shown) being employed to vent the reservoir member 14 so that air may be initially expelled therefrom. When the reservoir is full, slight pressure on the fluid will then cause it to permeate the rubber mold member. Normally a pressure equivalent to a column of only a few inches of the silicone fluid is suitable for this purpose. The specific pressure required for a given mold design to permit repetitive molding is readily determined by experimentation.

While this invention has been described in terms of a specific embodiment thereof it will be appreciated that other forms could readily be adapted by those skilled in the art accordingly the scope of the invention should be considered limited only by the following claims.

I claim:

1. In the art of forming moldable compositions in a silicone rubber mold, an improved method of introducing a film of silicone fluid release agent onto a cavity-defining surface of said mold member comprising the steps of providing a porous reservoir of silicone fluid release agent behind said mold cavity-defining surface and subjecting said fluid to pressure to cause it to flow through said rubber mold and reach said mold surface thereby providing a film of release fluid on said surface, said pressure being asserted immediately prior to and during the forming of said moldable compositions in said mold, said porous reservoir being of suitable strength to support said silicone rubber member against normal molding pressures.

2. A method of providing a film of release agent on the cavity-defining surface of a polydimethylsiloxane silicone rubber mold comprising the steps of forming a porous reservoir, forming a silicone rubber mold member on said porous reservoir having a cavity-defining surface of predetermined configuration, introducing a polydimethylsiloxane silicone fluid release agent into said reservoir and subjecting said fluid to pressure whereby said fluid permeates said mold member to coat said cavity-defining surface, said porous reservoir member being of suitable strength to support said silicone rubber member against normal molding pressures.

3. A method of providing a thin film of release agent on the mold cavity-defining surface of a silicone rubber mold member comprising forming a porous reservoir; molding a polydimethylsiloxane silicone rubber mold member upon said porous reservoir, said mold having a mold cavity-defining surface of predetermined configuration, the configuration of the interfacial surface of said reservoir with said mold member and the cross sectional configuration of said silicone mold member both being such that the maximum distance between said reservoir surface and said cavity-defining surface is not substantially greater than about one inch; introducing a polydimethylsiloxane silicone fluid release agent into said porous reservoir and subjecting said fluid to pressure whereby said fluid slowly permeates said silicone rubber mold to provide a thin film of said release agent on said cavity-defining surface, said porous reservoir being of suitable strength to support said silicone rubber member against normal molding pressures.

References Cited

UNITED STATES PATENTS

| 2,152,738 | 4/1939 | Jeffery. | |
| 2,937,406 | 5/1960 | Toddy. | |
| 3,003,190 | 10/1961 | Macks | 264—88 |
| 3,133,978 | 5/1964 | Bartley et al. | |
| 3,134,832 | 5/1964 | Smith. | |
| 3,304,577 | 2/1967 | Mott. | |

DONALD J. ARNOLD, Primary Examiner

A. H. KOECKERT, Assistant Examiner

U.S. Cl. X.R.

18—47; 249—115; 264—225, 313, 338